E. OTT.
DEVICE FOR COOLING THE AIR REQUIRED FOR MALTAGE.
APPLICATION FILED APR. 9, 1910.

980,828.

Patented Jan. 3, 1911.
2 SHEETS—SHEET 1.

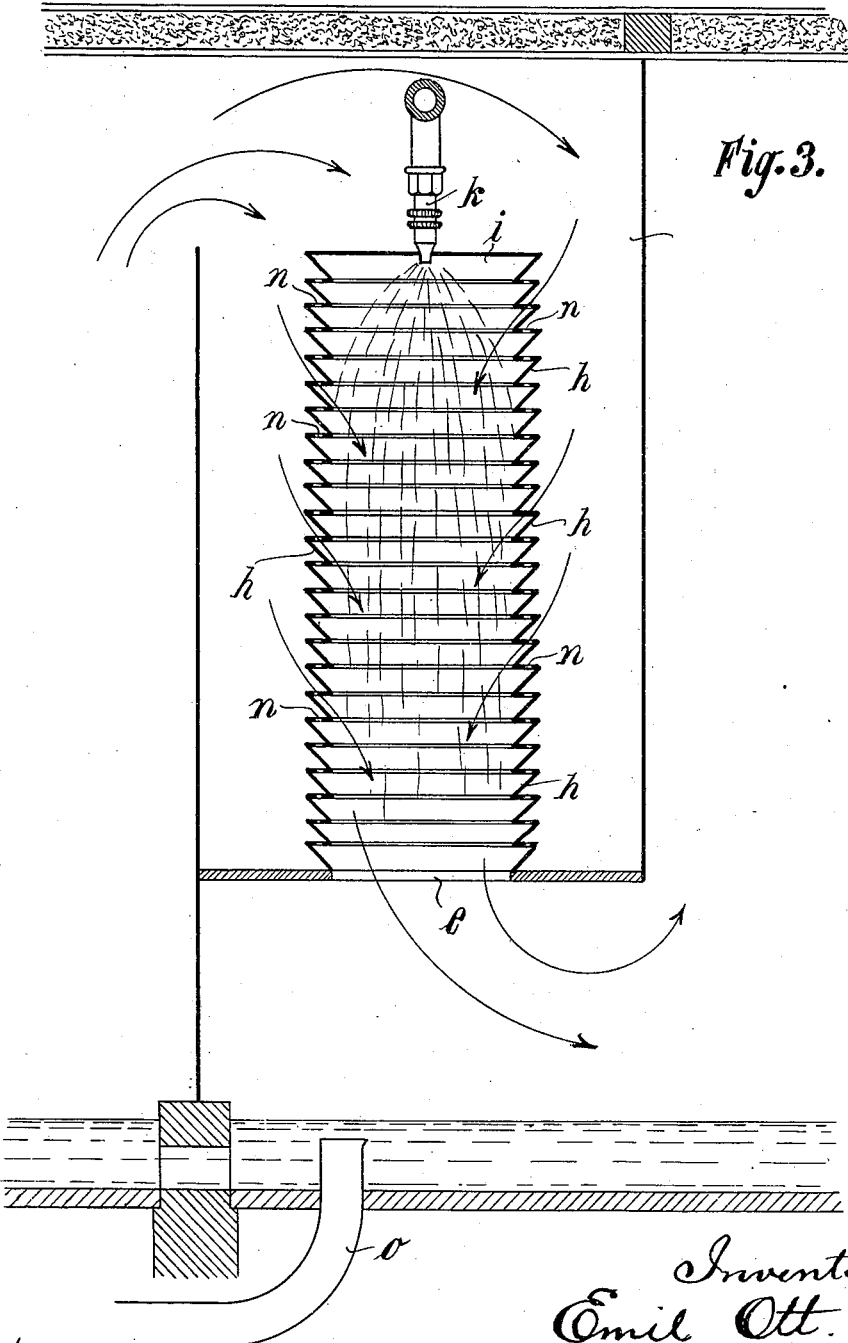

UNITED STATES PATENT OFFICE.

EMIL OTT, OF BERLIN, GERMANY.

DEVICE FOR COOLING THE AIR REQUIRED FOR MALTAGE.

980,828.  Specification of Letters Patent.  Patented Jan. 3, 1911.

Application filed April 9, 1910. Serial No. 554,371.

*To all whom it may concern:*

Be it known that I, EMIL OTT, engineer, a subject of the King of Prussia, residing at Berlin, Germany, have invented a new and useful Device for Cooling the Air Required for Maltage, of which the following is a specification.

As is known malt is produced by soaking barley and arresting the germination thereof after a suitable interval of time by heating. The proper regulation of the germination is one of the most important features in malting. In order to get favorable results it is important that the air supplied to the soaking barley be fully moistened with water, and that suitable temperatures are maintained in the malt. According to the well-known practice the barley is first steeped in water and then spread upon floors. Assuming that the desired period of germination is ten days, ten floors are necessary; the soaked grain being moved daily from one floor to the next, so that on the 10th day it lies upon the tenth floor. Air is passed along the said floors to regulate the temperature of the soaked barley so as to keep it properly moistened while preventing formation of mold.

The object of this invention is to provide means for cooling and moistening the air required for malting; and to enable the air to be brought to the desired temperature quickly with the use of less water than hitherto required.

Figure 1:
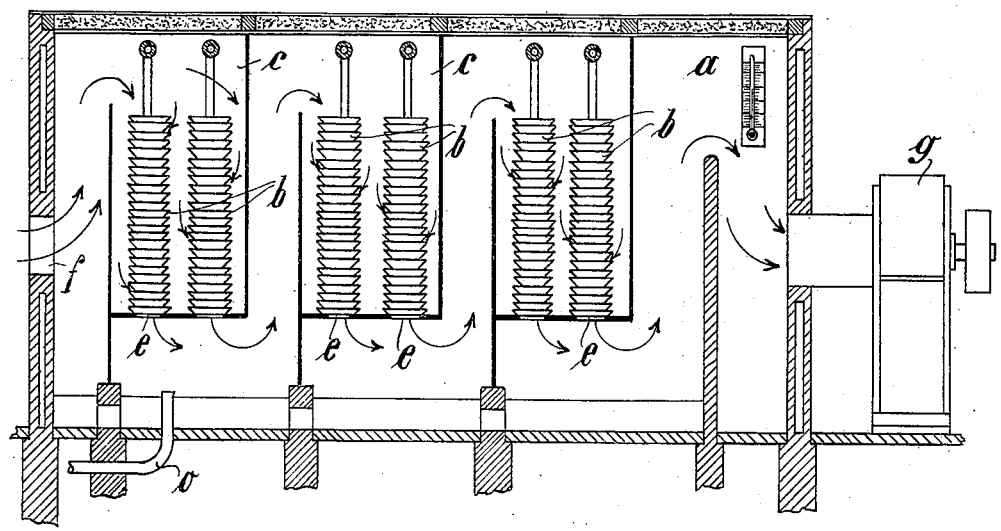
Figure 2:
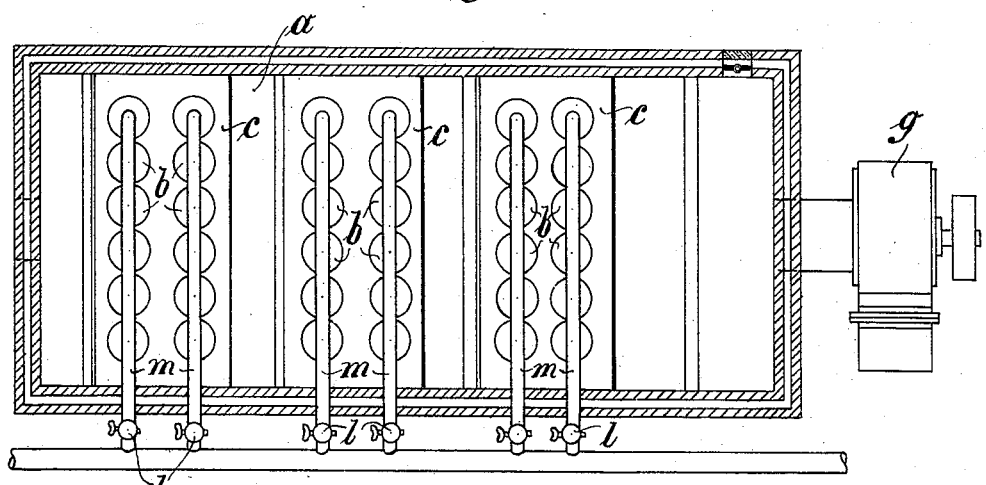

In the drawings, forming a portion of this specification like letters of reference indicate similar parts, and Figure 1 is a section through a cooling and moistening device. Fig. 2 is a plan view of the same. Fig. 3 is an enlarged view of one of the air cooling and moistening devices.

In the arrangement as shown in Figs. 1 and 2 three sets of cooling batteries $b$ are arranged in a chamber $a$. Each battery comprises a series of similarly constructed air moisteners and coolers, working together, and the batteries are placed in separate compartments $c$ in chamber $a$, each compartment communicating with the next by bottom openings $e$. Air is admitted into the chamber and first compartment at an aperture $f$, and may be caused to successively traverse the compartments by a fan $g$.

Each cooling battery $b$ is located over an outlet opening $e$ in the bottom of its chamber and is closed at top, consequently when the air is drawn through the chamber it is caused to enter between the rings of the battery and pass downward through the battery to the outlet opening $e$, being subjected in its passage to the action of the cooling and moistening jets. The successive chambers $b$ are so arranged that air must pass downwardly through the battery or batteries in each chamber and then pass upwardly to enter the top of the next chamber.

Each unit of a cooling battery is constructed of concentrically arranged rings placed one above the other, see Fig. 3, and connected in any desired manner. The said rings are inwardly tapered or beveled as shown, and the upper one is closed, but water is admitted into the uppermost ring by a set head $i$ connected with the feed pipe $m$, and the supply can be regulated by a valve $l$ (Fig. 2). The set head $i$ is constructed so that the water will pass down through the cooling chamber in a finely disseminated state. The rings $h$ as may be seen from the drawings have open spaces at their peripheries for the entrance of air which is drawn in through the spaces $n$ from all sides and passes over the inclined inner walls of the rings $h$ into the cooling vessel, whereby a very intimate contact of the water and the air is produced and the air is saturated with the water and cooled to the desired temperature. The jets can be so nicely adjusted that in the first chamber nearly all the water will be taken up by the air so that there will be very little water wasted. Where the atmospheric temperature is not high, one or more of the cooling batteries can be cut out of operation. Any water collecting in the cooling chambers can escape through a waste pipe $o$.

What I claim is:

1. An apparatus for cooling and moistening air comprising a chamber having an outlet opening in its bottom, a cooling battery comprising a series of superposed spaced conical rings arranged over said outlet opening the upper end of the battery being closed; means for spraying water upon the interior surfaces of the rings, and means for passing air from said chamber between the rings into the battery and thence downward to the outlet opening.

2. An apparatus for cooling and moistening air comprising a chamber having an inlet near its top, and an outlet opening in its bottom; a cooling battery comprising a series of superposed spaced conical rings arranged over the outlet opening; means for spraying water upon the interior surfaces of the rings, and means whereby the air in said chamber is caused to pass between the rings and into the battery and thence downward to the outlet opening.

3. In an apparatus for cooling and moistening air for malting, the combination of a series of chambers each provided with an inlet at its top and an outlet in its bottom, the lower end of one chamber communicating with the upper end of the next chamber by a suitable passage, and means for creating a continuous draft of air successively through the chambers; with a cooling battery in each chamber, comprising a vertical series of superposed conical rings, closed at top and open at bottom and communicating with the outlet opening of the chamber in which it is placed; and means for spraying cooling and moistening fluid into the upper end of said battery, the air being drawn between the rings into the battery and thence passed downward and out through the opening in the bottom of the chamber.

EMIL OTT.

Witnesses:
 HENRY HASPER,
 WOLDEMAR HAUPT.